United States Patent
Jartoux et al.

(10) Patent No.: US 6,301,735 B1
(45) Date of Patent: Oct. 16, 2001

(54) METHOD AND DEVICE FOR ATTACHING A LOAD-TRANSMITTING ELEMENT TO A CABLE, AND SUSPENSION BRIDGE COMPRISING SUCH DEVICES

(75) Inventors: Pierre Jartoux, Versailles; Jérôme Stubler, Paris, both of (FR)

(73) Assignee: Freyssinet International STUP (FR)

( * ) Notice: Subject to any disclaimer, the term of this patent is extended or adjusted under 35 U.S.C. 154(b) by 0 days.

(21) Appl. No.: 09/486,029

(22) PCT Filed: Jun. 16, 1999

(86) PCT No.: PCT/FR99/01441

§ 371 Date: Feb. 18, 2000

§ 102(e) Date: Feb. 18, 2000

(87) PCT Pub. No.: WO99/67550

PCT Pub. Date: Dec. 29, 1999

(30) Foreign Application Priority Data

Jun. 19, 1998 (FR) .................................................. 98 07782

(51) Int. Cl.⁷ .............................. E01D 11/00; E01D 19/16
(52) U.S. Cl. .................... 14/22; 14/20; 14/21; 248/68.1; 248/74.4
(58) Field of Search .................... 14/18, 19, 20, 14/21, 22; 248/68.1, 72, 74.4

(56) References Cited

U.S. PATENT DOCUMENTS

| | | | |
|---|---|---|---|
| 1,678,292 | * 7/1928 | Howe | 14/22 |
| 2,361,943 | * 11/1944 | Issoglio et al. | 248/68.1 |
| 2,362,124 | * 11/1944 | Ellinwood | 248/68.1 |
| 2,674,772 | * 4/1954 | Jacobs | 248/68.1 |
| 2,937,835 | * 5/1960 | Csmereka | 248/74.4 |
| 3,457,717 | * 7/1969 | Durkee et al. | 24/22 |
| 3,531,071 | * 9/1970 | Kubli | 248/68.1 |
| 4,569,708 | * 2/1986 | Tanaka et al. | 14/22 |
| 4,612,680 | * 9/1986 | Daiguji | 14/22 |
| 4,718,965 | * 1/1988 | Finsterwalder et al. | 14/22 |

FOREIGN PATENT DOCUMENTS

| | | |
|---|---|---|
| 0 789 110 | 8/1997 | (EP) . |
| 2 739 113 | 3/1997 | (FR) . |

* cited by examiner

*Primary Examiner*—Robert E. Pezzuto
*Assistant Examiner*—Alexandra K. Pechhold
(74) *Attorney, Agent, or Firm*—Cantor Colburn LLP

(57) ABSTRACT

The device comprises a collar consisting of two shells, designed to provide a link with the load-transmitting element. The cable has an assembly of tensioned strands contained, at the level of the collar, in a matrix filling the interstices between the strands. This matrix is totally or partially made from a plastic material susceptible to creep under the effect of the clamping action of the collar. The clamping action is applied by elongate elements transmitting a clamping force to the shells of the collar. These elongate elements are stressed so as to produce a longitudinal elastic deformation that is much greater than the maximum settlement of the matrix due to creep. This prevents any undesirable loosening of the collar.

23 Claims, 2 Drawing Sheets

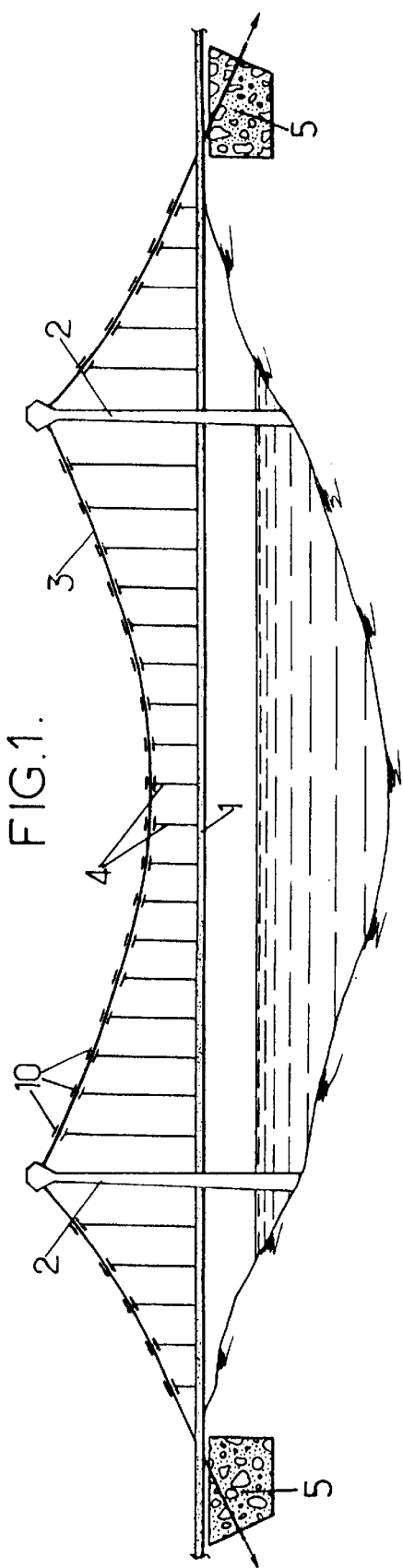
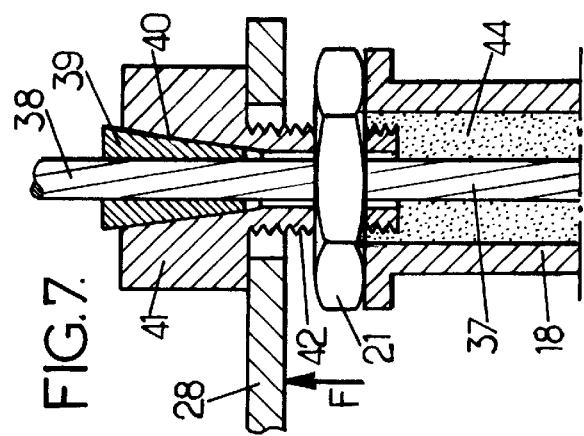
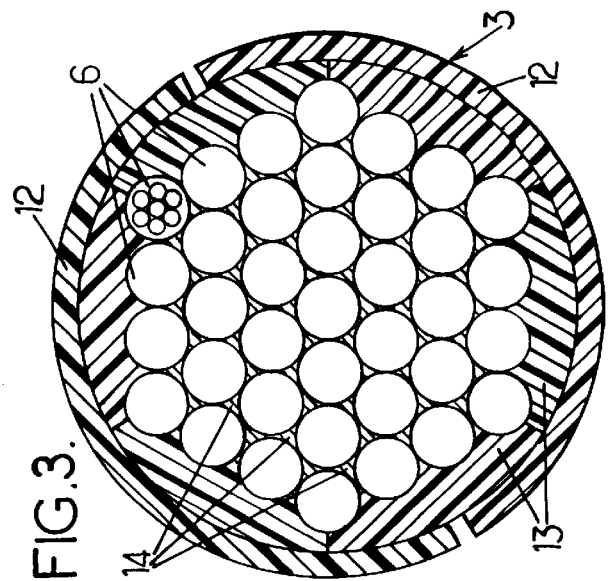
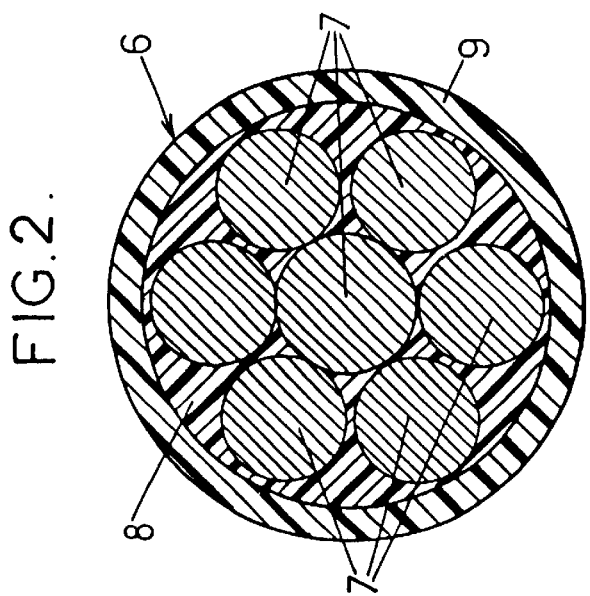

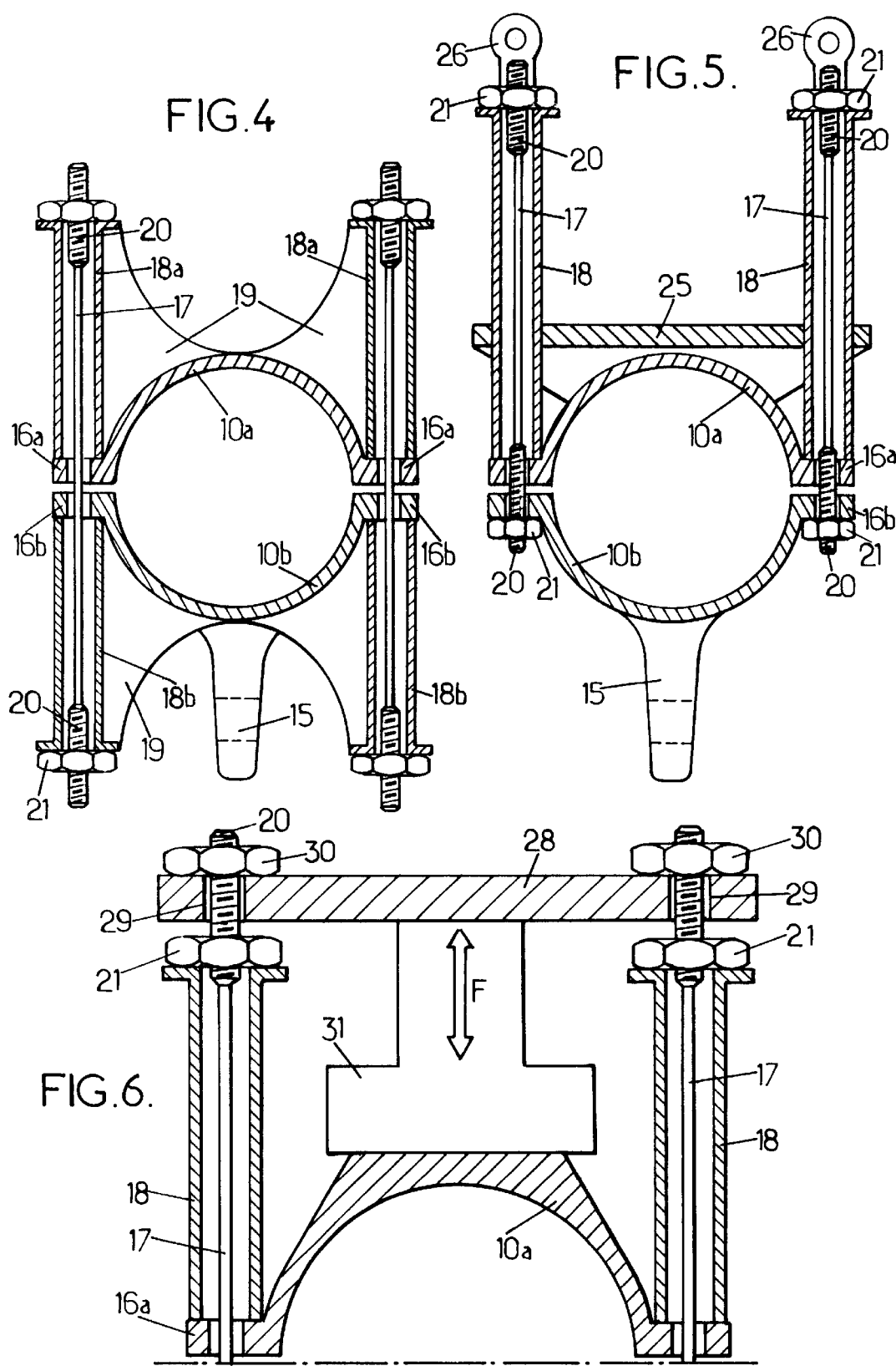

METHOD AND DEVICE FOR ATTACHING A LOAD-TRANSMITTING ELEMENT TO A CABLE, AND SUSPENSION BRIDGE COMPRISING SUCH DEVICES

BACKGROUND OF THE INVENTION

The present invention relates to the use of cables in certain construction techniques and more specifically to the methods used to attach load-transmitting elements to a structural cable.

An important, though not exclusive, application of the invention is that of suspension bridges. In this application, hangers transmitting the load of the deck have to be attached to a bearing cable of the bridge, formed of one or more bundles of strands.

This attachment is generally performed by means of collars, each being made up of several shells which are clamped around the cable using means such as bolts, each hanger being fixed to one of the shells of its collar. The clamping force applied to the collar enables the bearing cable to absorb, by friction, the tangential components of the forces transmitted by the hangers.

French patent 2 739 113 proposes a bearing cable made from a bundle of "coherent" strands. Each coherent strand comprises a strand strictly speaking, made up of a stranded assembly of seven or more metal wires, coated with an adherent elastomer material and surrounded by an individual sheath of plastic material, whereby the strand and the elastomer material fill the interior space of the individual sheath.

This strand structure limits the force needed for the clamping action, which improves the reliability of the system.

European patent application 0 789 110 discloses the insertion of filler elements in a cable made up of individually protected strands (for example coherent strands), the filler elements being placed at the level of the attachment collars so that they fill the interstices between the individual sheaths of the assembled strands, the cross-section of said interstices being triangular in shape with curved sides.

This arrangement ensures that the clamping forces of the collars are transmitted more evenly to the strands under tension. At the level of the collars, the bearing cable is contained in a tubular envelope made of plastic material and deformable elements are inserted between the envelope and the bundle of strands. This assembly is crushed instantly when the collars are clamped and is also subjected to a delayed crushing action due to the creep of the materials, generally plastic, from which the envelope, the deformable elements and/or the filler elements are made.

In the typical example of a collar having an internal diameter of 400 mm, the delayed settling of this assembly under the effect of creep is typically in the order of 1 mm. This value may cause the collar to loosen, which could have disastrous consequences. As a result, regular maintenance work has to be carried out to check the tightness of the clamped collars and re-clamp them as required.

An object of the present invention is to improve the clamping action of the attachment collars on a structural cable.

SUMMARY OF THE INVENTION

Accordingly, the invention proposes a device for attaching a load-transmitting element to a cable, comprising a collar formed of at least two shells and means for clamping the collar around the cable, at least one of the shells having means providing a link with the load-transmitting element. The cable comprises an assembly of tensioned strands contained, at the level of the collar, in a deformable matrix filling the interstices between the strands, at least part of the matrix being in a plastic material that is susceptible to creep under the action of the clamping means. According to the invention, the clamping means comprise elongate clamping elements which transmit a clamping force to the shells of the collar and which are stressed so as to have a longitudinal elastic deformation that is substantially greater than the maximum settlement of the matrix due to creep.

The pre-stressed clamping elements provide a sort of reserve capacity for deformation, allowing any settlement of the assembly located underneath the collar due to the effect of creep to be absorbed. By making the elastic extension of these clamping elements much greater than the foreseeable settlement of the cable due to creep (typically at least five times greater), the clamping action can be guaranteed to remain at a controllable value and close to the initial value.

In preferred embodiments of the device according to the invention:

- each tensioned strand of the cable consists of a strand coated with an adherent elastomer material and surrounded by an individual sheath of plastic material, whereby the strand and the elastomer material fill the interior space of the individual sheath (coherent strand);
- the matrix comprises inserts having a triangular-shaped cross-section with curved sides, placed so as to fill, at the level of the collar, the interstices of matching shape located between the individual sheaths of the strands assembled in a bundle, and optionally elastomer elements arranged at the periphery of the bundled strands, and a tubular envelope made from a plastic material surrounding the elastomer elements, on which the shells of the collar bear;
- the elongate clamping element is a metal rod, at least one end of which has a thread for receiving a nut used to apply stress to it, or else a tensioned cable, at least one end of which is clamped by means of anchoring jaws;
- the elongate clamping element is housed in at least one bracing tube filled with a protective substance such as a petroleum wax, a grease or a resin.

A second aspect of the present invention relates to a suspension bridge, comprising at least one bearing cable anchored at its two ends and a deck suspended from the bearing cable by means of hangers, at least some of the hangers being attached to the bearing cable by means of attachment devices as defined above.

Advantageously, the attachment device has a portion which projects substantially above the bearing cable and which contains a stressed clamping element, the top end of said portion being fitted with means for fixing a hand rail to allow personnel to move along the bearing cable.

Another aspect of the present invention relates to a of attaching a load-transmitting element to a cable by means of a collar formed of at least two shells, the cable comprising an assembly of tensioned strands contained in a matrix at the level of the collar, at least part of the matrix being in a plastic material susceptible to creep under the clamping action exerted on the collar. In that method, the shells of the collar are clamped around the cable by means of elongate clamping elements which are stressed so as to have a longitudinal elastic deformation substantially greater than the maximum settlement of the matrix due to creep.

The method advantageously comprises a step of simultaneously applying the stresses to the elongate clamping elements by means of a hydraulic system, and a step of clamping the elongate clamping elements in the stressed position. This makes it possible to balance the forces exerted on all the clamping elements of a same collar and avoid subjecting the elements to individual clamping forces that would cause twisting.

In specific approaches to implementing the method:

the steps of simultaneously applying stresses and clamping in the stressed position are carried out after the collar has been fitted around the cable, as well as during subsequent monitoring and re-clamping operations.

the step of simultaneously applying stresses comprises a first phase in which the hydraulic system exerts an excessive stress followed by a second phase in which the applied stresses are reduced before proceeding with the clamping stage.

the steps during which stresses are applied simultaneously and the clamping action is applied in the stressed position are performed after the collar has been fitted around the cable, as well as subsequent checking and re-clamping operations;

the step during which stresses are applied simultaneously incorporates a first phase during which the hydraulic system exerts an excessive stress, followed by a second phase in which the stresses applied are reduced before proceeding with the clamping step.

BRIEF DESCRIPTION OF THE DRAWINGS

FIG. 1 is a general schematic view of a suspension bridge according to the invention;

FIG. 2 is a view in cross section of one of the coherent strands of a bearing cable of the suspension bridge illustrated in FIG. 1;

FIG. 3 is a view in cross section illustrating the layout of such strands inside the bearing cable at the level of a hanger attachment collar;

FIGS. 4 and 5 are views in cross section of two embodiments of attachment devices proposed by the invention;

FIG. 6 is a diagram illustrating one way of applying the initial stress to the clamping elements of such devices; and FIG. 7 is a schematic illustration of a alternative embodiment of the means for clamping the collar.

DESCRIPTION OF THE PREFERRED EMBODIMENTS

The suspension bridge illustrated by way of example in FIG. 1 conventionally comprises a deck 1, two pylons 2, two parallel bearing cables 3, only one of which is visible in the drawing, and a set of hangers 4 attached to the cables 3 by means of respective collars 10, and which carry the deck 1, transmitting its load to the bearing cables 3. The bearing cables 3 are tensioned between two ground anchorings 5 at the two ends of the bridge and are supported by the pylons 2. As illustrated, the bearing cables 3 may be discontinued at the level of the pylons 2, in which case they will be anchored on these pylons.

Each bearing cable 3 is made by assembling individually-protected strands 6 of the type illustrated in FIG. 2.

Each of these strands is made up of several twisted steel wires 7, which may be optionally galvanised, seven being provided in this case, which are embedded in an elastomer 8 such as polybutadiene or the like. The elastomer 8 is in turn covered by an external sheath 9 made from a flexible plastic material which might be a polyolefin, in particular high-density polyethylene (HDPE) or alternatively a polyamide. The elastomer 8 adheres to the twisted wires 7 forming the strand per se by surface adhesion and by conforming to its shape. This elastomer 8 is also adhered to the individual HDPE sheath 9. For more details on how this coherent strand is made, reference may be made to French patent 2 739 113.

The individual sheath 9 is integral with the steel wires 7 of the strand so that the forces applied to this sheath parallel with the axis of the strand 6 will be duly transmitted to the steel wires 7.

FIG. 3 shows the structure of a bearing cable 3 made up of a bundle of thirty seven coherent strands 6. Seen in cross-section, these strands 6 are arranged in a hexagonal lattice defining interstices between them in the shape of a triangle with curved sides.

At the level of the collars 10, the bundle of strands is housed in a tubular envelope formed by joining two semi-cylindrical shells 12 made from a plastic material such as HDPE. Elastomer elements 13 are arranged between the hexagonal bundle of strands and the internal face of the envelope 12 so as to hold the bundle in position inside the envelope and transmit the clamping forces exerted by the attachment collars 10 to the bundle.

Inserts 14 made from a plastic material, for example HDPE, are placed in the triangular interstices with curved sides, defined between the individual sheaths 9 of the strands 6, so as to fill these interstices at the level of the collars 10. The inserts 14 ensure that the clamping forces are evenly distributed between the different coherent strands 6, as explained in European patent application 0 789 110.

Accordingly, at the level of the collars 10, the bundle of strands 6 is contained in a matrix made up of the tubular envelope 12, the elastomer elements 13 and the inserts 14.

This matrix is likely to settle due to creep under the effect of the clamping action exerted by the collars 10. As mentioned above, a typical value for this settlement in the case of a cable with a diameter of 400 mm is 1 mm. If the collars are clamped in a conventional manner using steel bolts having a Young modulus of 20,000 kg/mm$^2$ having an active length of 150 mm with a tensile stress of 50 kg/mm$^2$, the elastic extension of these bolts is 150×50/20,000=0.375 mm, which is not enough to cope with the 1 mm settlement which can be expected. The deferred creep of the matrix containing the cable at the level of the collars will therefore cause the clamping forces initially applied to disappear.

In order to avoid this disadvantage, a hanging device of the type illustrated in FIG. 4 may be used. The collar 10 is made up of two (or more) semi-cylindrical shells 10a, 10b which bear on the tubular envelope 12 of the cable. The collar has a linking member 15, on its bottom shell 10b for example, for an articulated connection of the top end of the hanger 4.

At the level of the median plane where they face one another at a small distance apart, the shells 10a, 10b have side extensions 16a, 16b in which orifices are provided for inserting clamping elements 17.

The clamping elements 17 are elongate in shape. Four or more may be provided for each collar 10.

Each clamping element 17 is inserted through two bracing tubes 18a, 18b, one bearing against a side extension 16a of the top shell 10a and the other bearing against a side extension 16b of the bottom shell 10b.

The bracing tubes 18a, 18b may be integral with the shells 10a, 10b or be separate components. Each shell 10a, 10b may be provided with ribs 19 in planes transverse to the direction of the cable, so as to support the bracing tubes 18a, 18b.

In the embodiment illustrated in FIG. 4, the elongate clamping elements 17 consist of metal rods, the section of which may be in the order of one tenth of the internal section of the bracing tube and the ends 20 of which are threaded. A nut 21 is screwed onto each threaded end 20 and bears on the corresponding end of the bracing tube 18a, 18b opposite the side extension 16a, 16b of the shell.

These nuts 21 are tightened so as to pre-stress the metal rods 17. This pre-stress is such that the rods 17 undergo a longitudinal elastic deformation that is greater than the maximum settlement due to creep of the matrix containing the strands at the level of the collar. This elastic deformation or extension is preferably more than five times greater than the maximum settlement of the matrix due to creep.

By selecting rods 17 made from a steel with a Young modulus in the order of 20,000 kg/mm$^2$ and capable of withstanding tensile stress of 120 kg/mm$^2$ (a common value in pre-stress applications), it will be possible to use rods 17 of a length of 1 m, which will give an elastic extension in the order of 1000×120/20,000=6 mm. Accordingly, the typical settlement of 1 mm which occurs due to the effect of creep will give rise to a loss of only 16% of the clamping force initially applied.

In the clamping device illustrated in FIG. 4, the general design of the clamping means is symmetrical on either side of the median plane of the collar. The bracing tubes 18a, 18b may therefore be of a length in the order of 50 cm.

In the embodiment illustrated in FIG. 5, a single bracing tube 18 is provided for each pre-stressed rod 17. The bottom nut 21 bears directly on the side extension 16b of the bottom shell 10b, whilst the bracing tube 18, the length of which is 1 m, bears on the extension 16a of the top shell 10a.

FIG. 5 also shows a platform 25 provided above the bearing cable 3 to enable personnel to move along the cable. In particular, this platform 25 may be fixed onto the top shells 10a of the collars. The fact that the bracing tubes 18 and pre-stressed rods 17 project approximately 1 m above the bearing cable 3 allows their top ends to be fitted with members such as rings 26 so that a and rail can be installed for personnel moving around on the platform. These members 26 are screwed onto the threaded ends 20 of the rods 17 projecting above the nuts 21, for example.

FIG. 6 illustrates an advantageous way of applying the pre-stress to the clamping rods 17.

Once the shells 10a, 10b have been fitted on the cable 3, the bracing tubes 18 (or 18a, 18b) are set in place as well as the top and bottom nuts 21, which are not tightened at this stage.

A plate 28 in which orifices 29 are provided at the level of the top ends 20 of the rods 17 is mounted above the assembly so that the ends 20 of the rods 17 project through the orifices 29. A nut 30 is then tightened on each of the threaded ends 20 projecting above the plate 28. A hydraulic system 31, which might consist of one or more jacks, is arranged between the top face of the shell 10a and the bottom face of the plate 28. A similar arrangement (plate 28, nuts 30 and hydraulic system 31) may optionally be provided in a symmetrical arrangement underneath the bottom shell 10b of the collar.

In a first step, the hydraulic system 31 is energised so that a force F is applied which places tension on the rods 17, the top end 20 of which is raised by the nut 30 biased by the plate 28. When the nominal force F is applied or once the required deformation of the rods 17 is obtained, the upper nuts 21 are brought into contact with the top end of the bracing tubes 18, clamping the rods 17 in the stressed position. The hydraulic system 31 can then be deactivated, the provisional nuts 30 and plate 28 dismantled and the hydraulic system 31 removed.

This method of clamping avoids applying any torsion to the rods 17 and provides a good balance of forces between the different rods 17 used to clamp the same collar.

In the step of energising the hydraulic system 31, it is possible to start by applying an initial excessive clamping force, i.e. a force F greater than the nominal force, so as to induce creep of the matrix containing the bundle of strands more rapidly. This initial excessive clamping is suppressed after a period, which may be several hours. The nominal force is then applied before the rods are clamped by the nuts 21.

The clamping method described above using the plate 28, nuts 30 and hydraulic system 31 may be applied at the time when the collars 10 are mounted but may also be effected during subsequent monitoring and, optionally, re-clamping operations. However, these operations will not have to be carried out as frequently as they would have to be if the clamping elements 17 had not been pre-stressed as proposed by the invention.

FIG. 7 shows another embodiment of the invention, in which the elongate clamping elements are not threaded rods but cables 37 made up or one or more strands (one in the example illustrated).

The strand 37 is housed in the bracing tube 18 and its top end 38 is clamped by an anchoring jaw 39 of a generally frusto-conical shape comprising several wedges. The outer side of the anchoring jaw 39 is supported against a matching frusto-conical surface of an orifice 40 provided in a socket 41. Underneath the portion in which the orifice 40 is provided, the socket 41 has a threaded extension 42 on which the clamping nut 21 engages.

As illustrated in FIG. 7, the socket 41 has a shoulder between its threaded portion 42 and its portion having the frusto-conical orifice 40, engaged by the plate 28 used to apply tension to the clamping elements 37. When this plate 28 is biased by the force F exerted by the hydraulic system 31, the socket 41 is raised, which causes the anchoring jaw 39 to clamp firmly on the strand 37. Once the requisite force is applied, the nut 21 is lowered along the threaded portion 42 so that it engages the top end of the bracing tube 18.

The bottom end of the strand 37 may also be anchored by means of a jaw 39, or simply clamped by means of a protuberance formed at the end of the strand by drawing or pressing.

As illustrated in FIG. 7, the bracing tube 18 containing the strand 37 is advantageously filled with a protective substance 44 which might be a petroleum wax, a grease or alternatively a resin. A protective substance 44 of this type may also be provided if the elongate clamping element is of a different type, for example a threaded rod 17.

Although the invention is described here with reference to its preferred application to suspension bridges, it may clearly be applied to other structures requiring the use of cables subjected to transverse loads.

What is claimed is:

1. An attachment device comprising:
   a cable;
   a load transmitting element; and
   a collar including at least two shells and means for clamping the collar around the cable, at least one of the at least two shells having means providing a link with the load-transmitting element;
   wherein the cable includes an assembly of tensioned strands contained, at a level of the collar, in a deformable matrix filling interstices between the strands, at least part of the matrix being in a plastic material that is susceptible to creep under the action of the clamping means;
   wherein the clamping means comprise elongate clamping elements which transmit a clamping force to the at least two shells of the collar and which are stressed so as to have a longitudinal elastic deformation substantially greater than a maximum settlement of the matrix due to creep.

2. A device according to claim 1, wherein each tensioned strand of the cable consists of a strand coated with an adherent elastomer material and surrounded by an individual sheath of plastic material, whereby the strand and the elastomer material fill the interior space of the individual sheath.

3. A device according to claim 2, wherein the matrix comprises inserts having a triangular-shaped cross-section with curved sides, placed so as to fill, at the level of the collar, the interstices of matching shape located between the individual sheaths of the strands assembled in a bundle.

4. A device according to claim 3, wherein the matrix further comprises elastomer elements arranged at the periphery of the bundle of strands and a tubular envelope of plastic material surrounding the elastomer elements, on which the at least two shells of the collar bear.

5. A device according to claim 1, wherein each elongate clamping element is housed in at least one bracing tube filled with a protective substance.

6. A device according to claim 5, wherein said protective substance is selected from the group comprising petroleum waxes, greases and resins.

7. A device according to claim 1, wherein each elongate clamping element is stressed so as to have a longitudinal elastic deformation at least five times greater than the maximum settlement of the matrix due to creep.

8. A device according to claim 1, wherein each elongate clamping element is a metal rod, having at least one end provided with a thread for receiving a nut used to apply stress thereto.

9. A device according to claim 1, wherein the elongate clamping elements are tensioned cables, having at least one end clamped by means of anchoring jaws.

10. A method of attaching a load-transmitting element to a cable by means of a collar formed of at least two shells, the cable comprising an assembly of tensioned strands contained in a matrix at a level of the collar, at least part of the matrix being in a plastic material susceptible to creep under the clamping action exerted on the collar, wherein the at least two shells of the collar are clamped around the cable by means of elongate clamping elements which are stressed so as to have a longitudinal elastic deformation substantially greater than a maximum settlement of the matrix due to creep.

11. A method according to claim 10, further comprising a step of simultaneously applying stresses to the elongate clamping elements by means of a hydraulic system, and a step of clamping the elongate clamping elements in a stressed position.

12. A method according to claim 11, wherein said steps of simultaneously applying stresses and clamping in the stressed position are effected after the collar has been fitted around the cable, as well as during subsequent monitoring and re-clamping operations.

13. A method according to claim 11, wherein the step of simultaneously applying stresses comprises a first phase in which the hydraulic system exerts an excessive stress followed by a second phase in which the applied stresses are reduced before proceeding with the clamping stage.

14. A suspension bridge comprising at least one bearing cable having two anchored ends, a deck, hangers for suspending the deck from the at least one bearing cable and at least one attachment device for attaching a respective hanger to the at least one bearing cable, wherein said attachment device comprises a collar formed of a least two shells and means for clamping the collar around the at least one bearing cable, at least one of the at least two shells having means for connection to the respective hanger, wherein the at least one bearing cable comprises an assembly of tensioned strands contained, at a level of the collar, in a deformable matrix filling the interstices between the strands, at least part of the matrix being in a plastic material that is susceptible to creep under the action of the clamping means, wherein the clamping means comprise elongate clamping elements which transmit a clamping force to the at least two shells of the collar and which are stressed so as to have a longitudinal elastic deformation substantially greater than a maximum settlement of the matrix due to creep.

15. A suspension bridge according to claim 14, wherein each tensioned strand of the at least one bearing cable comprises a strand coated with an adherent elastomer material and surrounded by an individual sheath of plastic material, whereby the strand and the elastomer material fill the interior space of the individual sheath.

16. A suspension bridge according to claim 15, wherein the matrix comprises inserts having a triangular-shaped cross-section with curved sides, placed so as to fill, at the level of the collar, the interstices of matching shape located between the individual sheaths of the strands assembled in a bundle.

17. A suspension bridge according to claim 16, wherein the matrix further comprises elastomer elements arranged at the periphery of the bundle of strands and a tubular envelope of plastic material surrounding the elastomer elements, on which the shells of the collar bear.

18. A suspension bridge according to claim 14, wherein each elongate clamping element is housed in at least one bracing tube filled with a protective substance.

19. A suspension bridge according to claim 18, wherein said protective substance is selected from the group comprising petroleum waxes, greases and resins.

20. A suspension bridge according to claim 14, wherein each elongate clamping element is stressed so as to have a longitudinal elastic deformation at least five times greater than the maximum settlement of the matrix due to creep.

21. A suspension bridge according to claim 14, wherein each elongate clamping element is a metal rod, having at least one end provided with a thread for receiving a nut used to apply stress thereto.

22. A suspension bridge according to claim 14, wherein the elongate clamping elements are tensioned cables, having at least one end clamped by means of anchoring jaws.

23. A suspension bridge according to claim 14, wherein the attachment device has a portion which projects substantially above the at least one bearing cable and which contains a stressed clamping element, the portion having a top end fitted with means for fixing a hand rail to allow personnel to move along the at least one bearing cable.

* * * * *